(12) United States Patent
Kim et al.

(10) Patent No.: US 8,441,678 B2
(45) Date of Patent: May 14, 2013

(54) IMAGE FORMING APPARATUS AND METHOD

(75) Inventors: Na-young Kim, Suwon-si (KR);
Sung-won Chae, Seoul (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 753 days.

(21) Appl. No.: 12/542,839

(22) Filed: Aug. 18, 2009

(65) Prior Publication Data

US 2010/0103436 A1    Apr. 29, 2010

(30) Foreign Application Priority Data

Oct. 23, 2008 (KR) .................. 10-2008-0104422

(51) Int. Cl.
*H04N 1/00* (2006.01)
*G06K 15/00* (2006.01)

(52) U.S. Cl.
USPC .......... 358/1.6; 358/1.13; 358/1.15; 358/1.18

(58) Field of Classification Search ............... 358/1.1, 358/1.6, 1.9, 1.13, 1.14, 1.15, 1.18, 448, 358/474, 468, 500; 399/370, 376, 386
See application file for complete search history.

(56) References Cited

U.S. PATENT DOCUMENTS

| | | | |
|---|---|---|---|
| 6,456,732 B1 * | 9/2002 | Kimbell et al. | 382/112 |
| 6,809,831 B1 * | 10/2004 | Minari | 358/1.15 |
| 6,823,147 B2 * | 11/2004 | Jackelen et al. | 399/16 |
| 6,865,354 B2 * | 3/2005 | Jackelen et al. | 399/81 |
| 7,907,313 B2 * | 3/2011 | Kurihara | 358/500 |
| 2004/0047643 A1 * | 3/2004 | Jackelen et al. | 399/81 |
| 2005/0031392 A1 * | 2/2005 | Yamamoto et al. | 400/62 |
| 2005/0243368 A1 * | 11/2005 | Sedky et al. | 358/1.16 |
| 2007/0050320 A1 * | 3/2007 | Carrier | 707/1 |
| 2008/0024802 A1 * | 1/2008 | Kato | 358/1.9 |
| 2008/0151294 A1 * | 6/2008 | Natori et al. | 358/1.15 |
| 2008/0158582 A1 * | 7/2008 | Uotani | 358/1.13 |
| 2010/0053668 A1 * | 3/2010 | Huh et al. | 358/1.15 |

OTHER PUBLICATIONS

"XML Paper Specification." *XPS Specification and Reference Guide*. 2006. Microsoft Corporation. 433 pages. (Emphasis on pp. 39-44, and Figs. 3-1-3-4.).

* cited by examiner

*Primary Examiner* — Dennis Dicker

(74) *Attorney, Agent, or Firm* — Staas & Halsey LLP

(57) ABSTRACT

An image forming apparatus includes a communication interface unit to receives an XML paper specification (XPS) file, an XPS file processing unit which converts the XPS file into an output data corresponding to printing paper to print the XPS file using information regarding the height and width of a FixedPage in the XPS file, and a control unit which controls the image forming apparatus to print the output data. Accordingly, even when an XPS file does not include information regarding printing paper, a user can select and print printing paper suitable for the user's demand.

19 Claims, 8 Drawing Sheets

IMAGE FORMING APPARATUS AND METHOD

CROSS-REFERENCE TO RELATED APPLICATIONS

This application claims the benefit of Korean Application No. 10-2008-0104422, filed in the Korean Intellectual Property Office in Oct. 23, 2008, the disclosure of which is incorporated herein by reference.

BACKGROUND OF THE INVENTION

1. Field of the Invention

Aspects of the present invention relate to an image forming apparatus and method, and more particularly, to an image forming apparatus that selects and prints paper suitable for a user's demand based on information regarding the width and height of a FixedPage when an XML paper specification (XPS) file does not include information regarding printing paper, and an image forming method thereof.

2. Description of the Related Art

Image forming apparatuses are devices that print printing data generated by a terminal device, such as a desktop computer, a laptop computer, a personal digital assistant (PDA), and a digital camera, on a recording medium. Examples of image forming apparatuses include copiers, printers, facsimile machines, and multifunction peripherals (MFP) implementing the functions of the aforementioned machines using a single device.

Recent image forming apparatuses support a direct printing function for files in Portable Document Format (PDF), Tagged Image File Format (TIFF), or Joint Photographic Experts Group (JPG). The direct printing function indicates directly performing printing simply by transmitting a file to an image forming apparatus without executing a separate application program in the terminal device.

As data to support the direct printing, an XML paper specification (XPS) file is used. An XPS file is a fixed-layout electronic file designed to preserve document fidelity and be capable of sharing the file, which is a zip archive in which all the resources needed for a corresponding document or job are systemized in a directory structure and the relationship between the directories is made up using an Extensible Markup Language (XML). Such an XPS file has a logical structure of a tree type having a plurality of layers as illustrated in FIG. 1.

FIG. 1 is a conceptual diagram illustrating a logical structure of an XPS file. As illustrated in FIG. 1, the XPS file includes several levels, such as a job level 10, a document level 20, and a page level 30. Each document level and each page level may include a plurality of documents and a plurality of pages, respectively. Different printing options can be set for each document and each page. A printing option set for a job level is applied to all areas under a corresponding job, a printing option set for a document level is applied to all areas under a corresponding document, and a printing option set for a page level is applied only to a corresponding page.

Information regarding printing paper onto which a page is printed is written in a PrintTicket corresponding to each level. The tag "PageMediaSize" in a PrintTicket includes information regarding printing paper.

However, as illustrated in FIG. 1, the "PageMediaSize" tag is an optional part in an XPS file. Accordingly, an XPS file may not include information regarding printing paper. However, the current specification of XPS does not define a method for processing such a case. Therefore, if a user prints an XPS file in which the printing paper option is not set, printing may not be performed. Even if printing is performed, the printed output may not have a format desired by the user. Therefore, there is a need for methods for selecting and printing paper suitable for a user's demand even when an XPS file does not include information regarding printing paper.

SUMMARY OF THE INVENTION

Aspects of the present invention provide an image forming apparatus that selects and prints paper suitable for a user's demand using information regarding the width and height of a FixedPage if an XML paper specification (XPS) file does not include information regarding printing paper, and an image forming method thereof.

According to an aspect of the present invention, an image forming apparatus is provided. The image forming apparatus includes a communication interface unit to receive an XML paper specification (XPS) file, an XPS file processing unit to convert the XPS file into output data corresponding to printing paper to print the XPS file based on information regarding the height and width of a FixedPage in the XPS file, and a control unit to control the image forming apparatus to print the output data.

According to another aspect of the present invention, the XPS file processing unit may include a determination unit to determine if a printing paper option is set for the XPS file, a search unit to search for the printing paper to print the XPS file based on the information regarding the height and width of the FixedPage in the XPS file when the printing paper option is not set for the XPS file, and a data generation unit to convert the XPS file into the output data corresponding to the searched printing paper.

According to another aspect of the present invention, the determination unit may identify the presence of a tag "PageMediaSize" in a PrintTicket of the XPS so as to determine if the printing paper option is set for the XPS file.

According to another aspect of the present invention, the image forming apparatus may further include a user interface (UI) unit to display a message that a printing paper option is not set for the XPS file if a printing paper option is not set for the XPS file.

According to another aspect of the present invention, the search unit may search for printing paper having the lowest error rate compared with the height and width of the FixedPage, or printing paper having the lowest error rate within a designated error rate range compared with the height and width of the FixedPage among printing paper supported by the image forming apparatus.

According to another aspect of the present invention, the search unit may search for printing paper having the lowest error rate compared with the height and width of the FixedPage, or printing paper having the lowest error rate within a designated error rate range compared with the height and width of the FixedPage by comparing the height and width of the FixedPage with the size of printing paper laid on a tray of the image forming apparatus.

According to another aspect of the present invention, the data generation unit may convert the XPS file into the output data so as to fit to the searched printing paper when the size of the searched printing paper is smaller than the height and width of the FixedPage, the data generation unit may convert the XPS file into the output data by clipping an area of the XPS file when the height or width of the FixedPage is greater than the size of the searched printing paper, and the data generation unit may convert all pages of the XPS file into the output data corresponding to the searched printing paper.

According to another aspect of the present invention, the UI unit may display the printing paper supported by the image forming apparatus, and receive setting of the printing paper to print the XPS file.

According to another aspect of the present invention, if a user selects at least one kind of printing paper from which the user can select, the UI unit may provides a preview on how the XPS file will be printed on the selected kind of printing paper.

According to another aspect of the present invention, the image forming apparatus may further include a storage unit to set the searched printing paper as an additional printing paper option for the XPS file, and to store the XPS file in which the printing paper option is set.

According to another aspect of the present invention, the communication interface unit may receive the XPS file in a direct printing method.

According to another aspect of the present invention, an image forming method of an image forming apparatus is provided. The method includes receiving an XML paper specification (XPS) file, determining if a printing paper option is set for the XPS file, searching for the printing paper to print the XPS file using the information regarding the height and width of a FixedPage in the XPS file when the printing paper option is not set for the XPS file, and printing the XPS file to correspond to the searched printing paper.

According to another aspect of the present invention, the determining operation may include identifying is the presence of a tag "PageMediaSize" in a PrintTicket of the XPS file, and determining if the printing paper option is set based on the presence of the tag "PageMediaSize".

According to another aspect of the present invention, the method may further include displaying a message that the printing paper option is not set for the XPS file when the printing paper option is not set for the XPS file.

According to another aspect of the present invention, the searching operation may include searching for printing paper having the lowest error rate compared with the height and width of the FixedPage, or printing paper having the lowest error rate within a designated error rate range compared with the height and width of the FixedPage among printing paper supported by the image forming apparatus.

According to another aspect of the present invention, the searching operation may include comparing the height and width of the FixedPage with the size of printing paper laid on a tray of the image forming apparatus, and searching for printing paper having the lowest error rate compared with the height and width of the FixedPage, or printing paper having the lowest error rate within a designated error rate range compared with the height and width of the FixedPage.

According to another aspect of the present invention, the printing operation may include converting the XPS file into the output data so as to fit to the searched printing paper if the size of the searched printing paper is smaller than the height and width of the FixedPage, converting the XPS file into the output data by clipping an area of the XPS file if the height or width of the FixedPage is greater than the size of the searched printing paper, and converting all pages of the XPS file into the output data corresponding to the searched printing paper.

According to another aspect of the present invention, the method may further include displaying the printing paper supported by the image forming apparatus, and receiving a setting of the printing paper to print the XPS file.

According to another aspect of the present invention, the receiving operation may include, providing a preview on how the XPS file will be printed on a selected kind of paper after a user selects at least one kind of printing paper from which the user can select.

According to another aspect of the present invention, the method may further include setting the searched printing paper as an additional a printing paper option for the XPS file, and storing the XPS file in which the printing paper option is set.

According to an aspect of the present invention, the receiving operation may include receiving the XPS file in a direct printing method.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Figure 1:
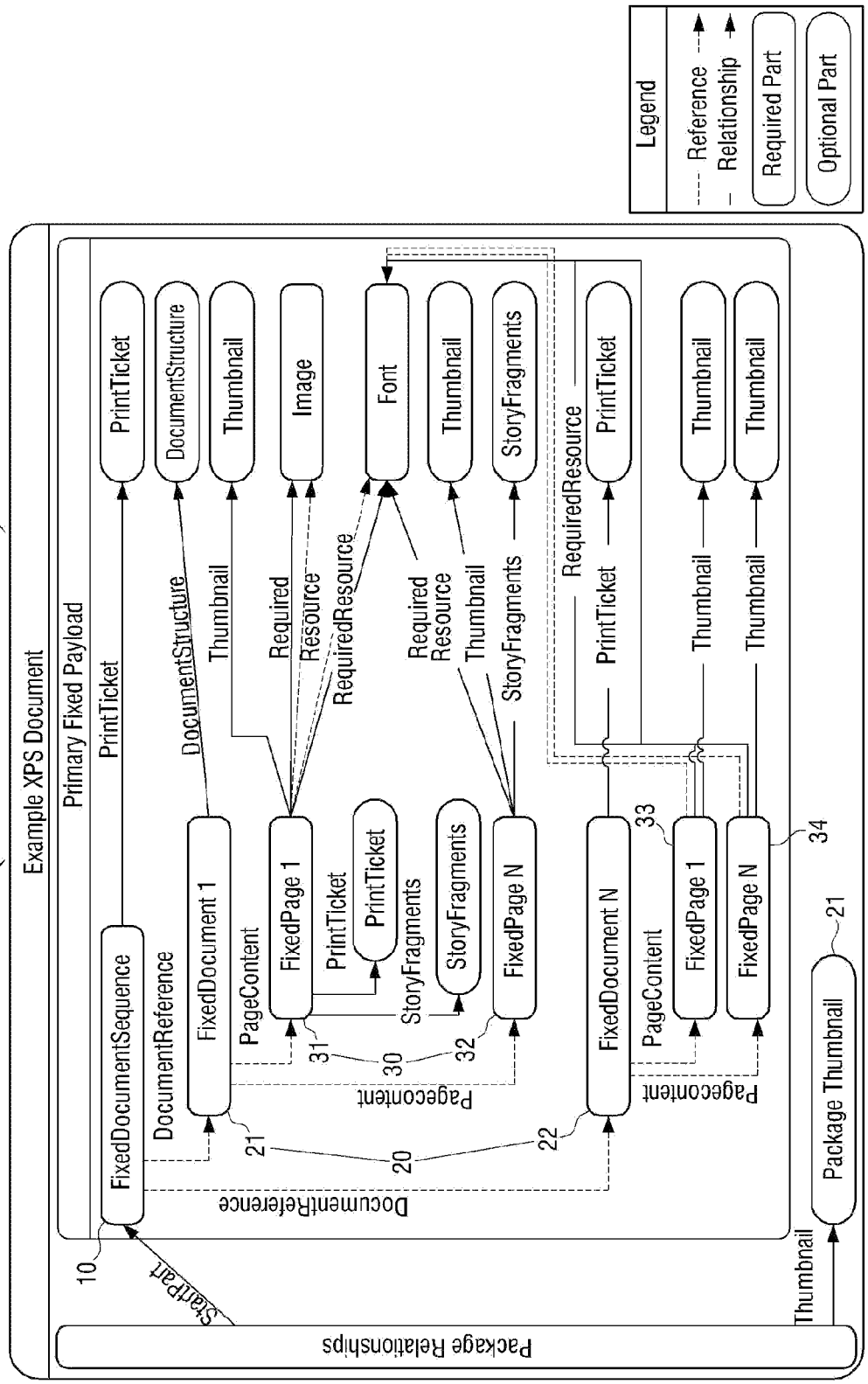
FIG. 1 illustrates a logical structure of an XPS file.

Reference will now be made in detail to the present embodiments of the present invention, examples of which are illustrated in the accompanying drawings, wherein like reference numerals refer to the like elements throughout. The embodiments are described below in order to explain the present invention by referring to the figures.

Figure 2:
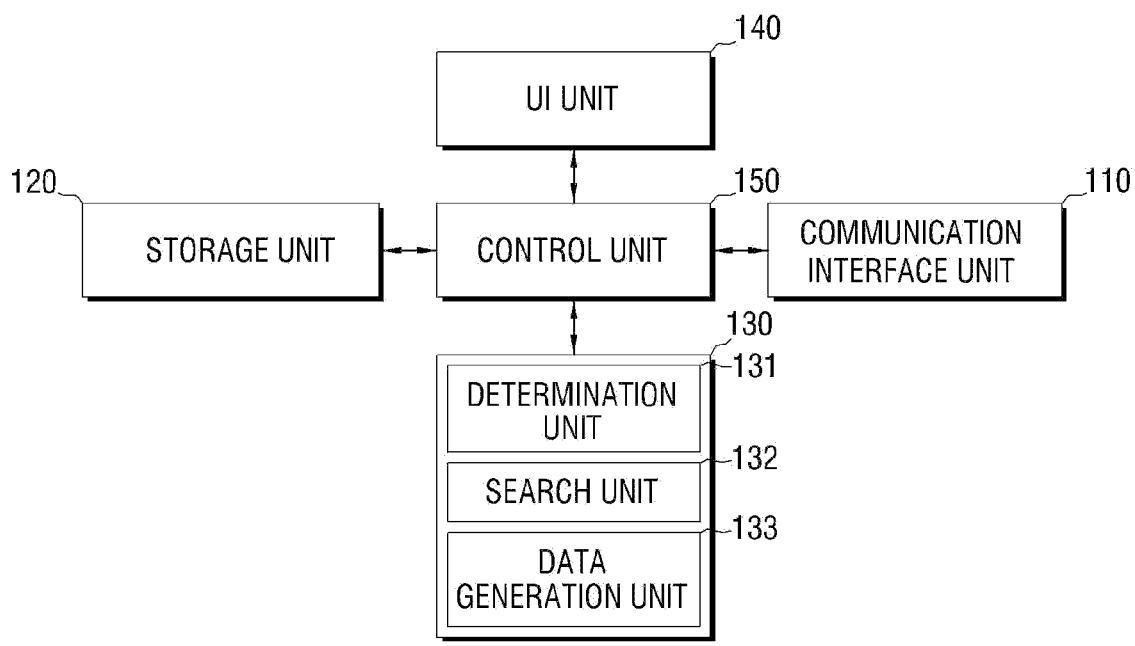
FIG. 2 illustrates a configuration of an image forming apparatus according to an embodiment of the present invention.

FIG. 2 illustrates a configuration of an image forming apparatus according to an embodiment of the present invention. The image forming apparatus 100 may include a communication interface unit 110, a storage unit 120, an XPS file processing unit 130, a user interface unit (UI) 140, and a control unit 150.

The communication interface unit 110 is connected to a terminal device (not shown) such as a desktop computer, a laptop computer, a personal digital assistant (PDA), and a digital camera, so as to receive an XML paper specification (XPS) file. The communication interface unit 110 is needed to connect the image forming apparatus 100 to an external device. The communication interface unit 110 may access a terminal device via Local Area Network (LAN) or Internet network, or through a Universal Serial Bus (USB) port. The communication interface unit 110 may receive an XPS file itself in a direct printing method. The communication interface unit 110 may receive an XPS file from a terminal device (not shown) in a direct printing method, or receive an XPS file from a storage medium, such as a USB memory via the USB port.

An XPS file is printing data in which a printing option is set in a tree structure having a plurality of layers as described above. An XPS file has a plurality of layers, and a different printing option can be set for each node of each layer and each tree.

For example, as shown in FIG. 1, an XPS file may have three layers, such as a job level 10, a document level 20, and a page level 30. Different printing options may be set for a plurality of documents and a plurality of pages in each document level 20 and each page level 30 respectively. Different printing options can be set so that "double-sided printing" is set for the job level 10 as a printing option, "2n-up" is set for a first document 21 on the document level 20 as a printing option, "A4 size" is set for a first page 31 of the first document 21 as a printing option, and "A5 size" is set for a second page 32 of the first document 21 as a printing option. A printing option at each node of the logical structure is also applied effectively to lower layers.

The storage unit 120 stores an XPS file received from the terminal device (not shown) through the communication interface unit 110, and may store basic printing setting values of the image forming apparatus 100. For example, the storage unit 120 may store kinds or types of paper that can be processed by the image forming apparatus 100. The storage unit 120 may be implemented as a storage medium formed in the image forming apparatus 100, an external storage medium, such as a removable disk including a USB memory, a storage medium which is connected to a host, or a web server via a network. The paper may be any medium upon which an image can be formed, including paper, facsimile paper, transparent film, and the like.

The XPS file processing unit 130 converts an XPS file received through the communication interface unit 110 into an output data format corresponding to printing paper to be printed using information regarding the height and width of a FixedPage in the XPS file received through the communication interface unit 110. The XPS file processing unit 130 may include a determination unit 131, a search unit 132, and a data generation unit 133.

The determination unit 131 determines if a printing paper option is set for the XPS file. The determination unit 131 analyzes a structure of a PrintTicket of the XPS file received through the communication interface unit 110, and determines if the PrintTicket of the XPS file includes the tag "PageMediaSize," in order to determine whether a printing paper option is set for the received XPS file.

Diverse kinds of printing options for an XPS file may be set in the PrintTicket. Among the printing options, settings regarding printing paper are specified in the tag "PageMediaSize" of the PrintTicket. Accordingly, the printer option is set for the XPS file if the PrintTicket of the XPS file includes the tag "PageMediaSize". Alternatively, the printing paper option is not set for the XPS file if the PrintTicket of the XPS file does not include the tag "PageMediaSize".

The search unit 132 searches for printing paper to print the XPS file based on information regarding the height and width of a FixedPage in the XPS file if the printing paper option is not set for the XPS file. If the determination unit 131 determines that the printing paper option is not set for the XPS file, the search unit 132 extracts information regarding the height and width of the FixedPage in the XPS file.

As described above, the XPS file may be a zip archive in which all the resources needed for a corresponding document or job are systemized in a directory structure. If the XPS file is decompressed, a FixedPage corresponding to each page is stored in a corresponding folder in an fpage (FixedPage) file form. A FixedPage is a file including additional information regarding a printing area, and is thus stored according to a directory corresponding to each document and each page. A structure of the FixedPage is described with reference to FIG. 3.

Figure 3:
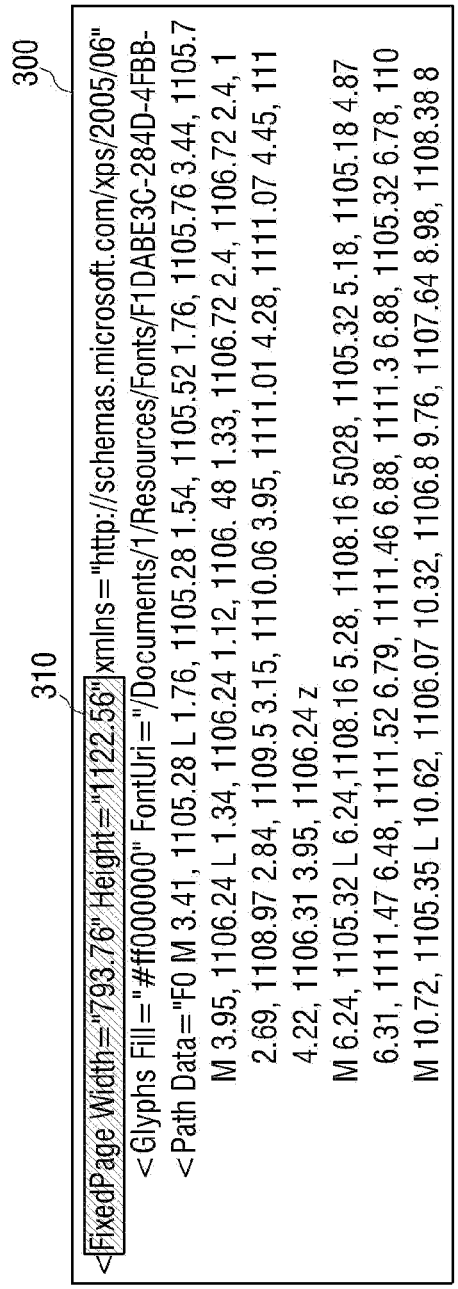
FIG. 3 illustrates an example of a structure of FixedPage file (.fpage file)

FIG. 3 illustrates an example of a structure of FixedPage file including information regarding the height and width of a printing area of a page of an XPS file. The information "<FixedPage Width="793.76" Height="1122.56" . . . >" regarding the height and width of a printing area of a page is written as illustrated in the boxed area 310 of FIG. 3. In FIG. 3, the width and height value of the FixedPage are set based on 96 DPI. If the unit is converted into inches, the printing area of the page has a width of 8.6 inches and a height of 11 inches.

The search unit 132 can identify the height and width of a page by reading out information regarding the height and width of a FixedPage from the XPS file. Subsequently, the search unit 132 searches for printing paper having the height and width greater than the FixedPage based on the information regarding the height and width of the page. A plurality of kinds of printing paper may be searched, and one of the kinds can be selected based on a pre-stored automatic search algorithm. Such an automatic search algorithm may be implemented using a database initially input by a developer, or updated based on a printing paper selection pattern of the user.

Alternatively, among diverse kinds of printing paper supported by the image forming apparatus 100, the search unit 132 may search for printing paper having a low error rate compared with the height and width of the FixedPage. The search unit 132 can search for printing paper having the lowest error rate compared with the height and width of the FixedPage by comparing the height of paper supported by the image forming apparatus 100 with the height of the FixedPage and comparing the width of paper supported by the image forming apparatus 100 with the width of the FixedPage. For example, in an image forming apparatus supporting paper types such as A3, A4, A5, A6, letter, and legal paper, a FixedPage of an input XPS file may have a width of 825.6 and a height of 1056. The width and height of the FixedPage are values which are set based on 96 DPI, and if these values are converted into inches, the FixedPage has a width of 8.6 inches and a height of 11 inches. Error rates between the width and height of the FixedPage and the width and height of paper supported by the image forming apparatus respectively are calculated using the following equations:

$$f(w) = \frac{ABS(Contentswidth - Paperwidth)}{Contentswidth} * 100 \quad \text{[Equation 1]}$$

In Equation 1, contentswidth denotes the width of the FixedPage, Paperwidth denotes the width of paper supported by the image forming apparatus, and ABS( ) denotes an numerical formula to obtain an absolute value.

$$f(h) = \frac{ABS(Contentsheight - Paperheight)}{Contentsheight} * 100 \quad \text{[Equation 2]}$$

In Equation 2, contentsheight denotes the height of the FixedPage, and Paperheight denotes the height of paper supported by the image forming apparatus.

$$errorrate = f(w) + f(h) \quad \text{[Equation 3]}$$

In Equation 3, f(w) denotes an error value of the width obtained by Equation 1, and f(h) denotes an error value of the height obtained by Equation 2. Such calculations are performed for each printing paper supported by the image forming apparatus, so printing paper having the lowest error rate can be selected. The above equations are merely an example; Equations 1 to 3 can be applied with appropriate modification as would be understood by those of ordinary skill in the art.

The search unit 132 may search for printing paper having the lowest error rate within a designated error rate range. The search unit 132 searches for printing paper having the lowest error rate of the height and width within a designated error rate range from among paper supported by the image forming apparatus 100.

The search unit 132 may search for printing paper by preferentially comparing the height and width of the FixedPage with printing paper laid on a tray of the image forming apparatus 100 from among paper supported by the image forming apparatus 100. The search unit 132 may also control the UI unit 140 to display a list of printing paper supported by the image forming apparatus 100 to the user, and searches for printing paper selected by the user as printing paper for the XPS file. Detailed description of this case will be given below.

The data generation unit 133 converts the XPS file into an output data format corresponding to the printing paper searched by the search unit 132. If the size of the searched printing paper is smaller than the height and width of the FixedPage, the data generation unit 133 may reduce the XPS file to fit to the searched printing paper, or clip an area of the XPS file. The operation of the data generation unit 133 in the case that the size of the searched printing paper is smaller than the height and width of the FixedPage, is described in detail with reference to FIGS. 6 and 7.

Figure 6:
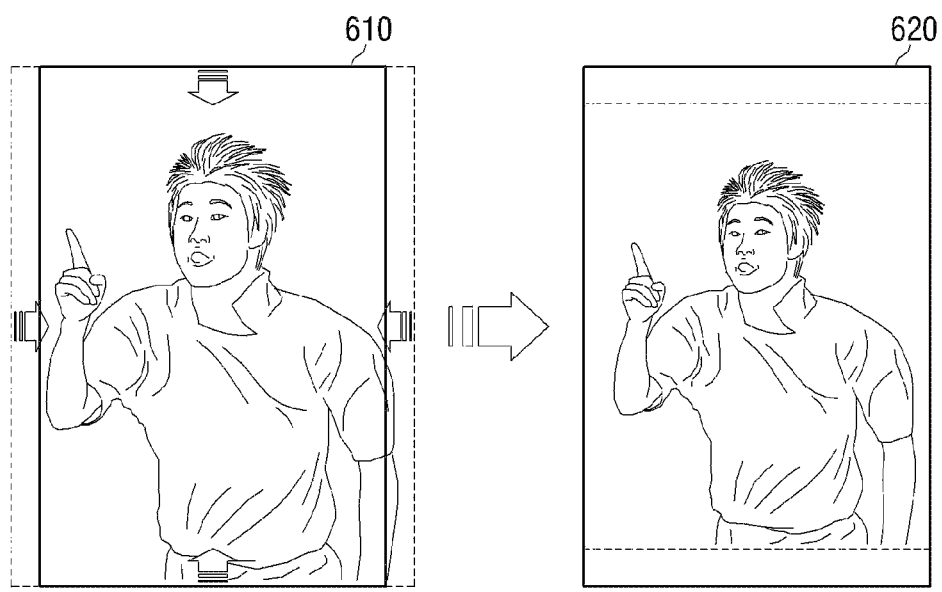
FIGS. 6 and 7 illustrate examples of adjusting printing data to be suitable for printing paper using the image forming apparatus.
Figure 7:
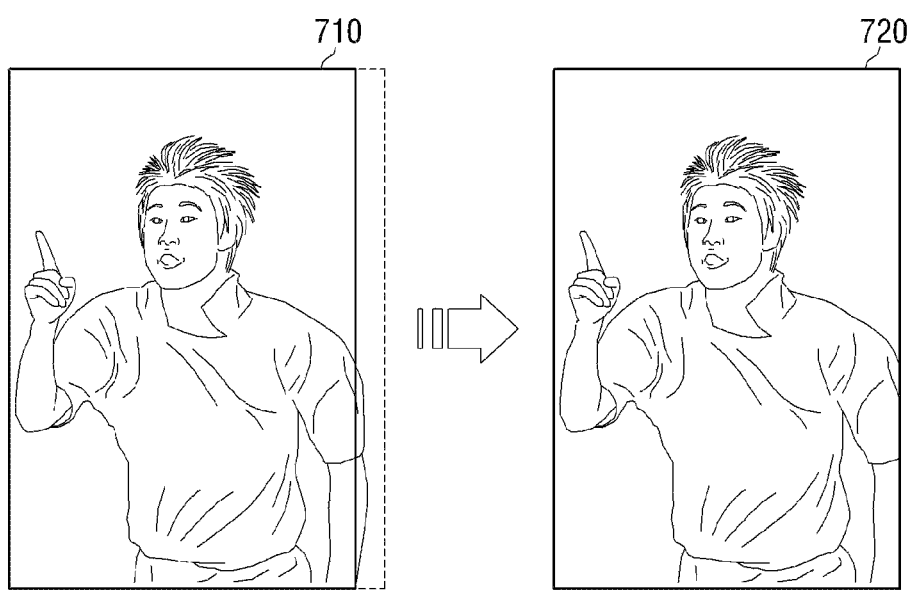

FIGS. 6 and 7 illustrate examples of adjusting printing data to be suitable for printing paper using the image forming apparatus 100. Referring to FIG. 6, if the width (expressed using the dotted line) of an output area of the XPS is larger than the width (expressed using the solid line) of paper searched by the search unit 132 as in the window 610, printing data is converted to be suitable for the searched paper by reducing the height and width of the output area of the XPS as in the window 620.

Referring to FIG. 7, if the width (expressed using the dotted line) of an output area of the XPS is larger than the width (expressed using the solid line) of paper searched by the search unit 132 as in the window 710, printing data is converted to be suitable for the searched paper by clipping a certain area of the XPS as in the window 720. The clipped area of the XPS may be a right or left part of the output area, or a right and left parts of the XPS may be clipped in the same ratio. In addition, the user can select an area of the XPS to clip. Similarly, if the height of the output area of the XPS is larger than the height of the paper, the top or bottom of the XPS may be clipped.

If a printing paper option is not set for the XPS file, the UI unit 140 displays a message that printing paper is not set for the XPS file, and thus the user sets paper to print the XPS file. The UI unit 140 includes a plurality of function keys in order for the user to set or select diverse functions supported by the image forming apparatus 100, and displays diverse information provided by the image forming apparatus 100. The UI unit 140 may be implemented as a device capable of performing input and output, such as a touch pad, or as combination of a mouse and a monitor.

The UI unit 140 may generate a UI window including a first area to display information regarding the height and width of a FixedPage, and a second area to display printing paper searched by the search unit 132 or printing paper which can be selected by the user. In addition, the UI unit 140 may display a message (such as a tooltip or dialog box) reporting that printing paper is not set for an XPS file. Detailed description of the UI window provided to the user will be given later.

The control unit 150 controls converted output data to be printed. The control unit 150 controls an engine unit (not shown) to perform diverse printing operations so as to print output data into which an XPS file is converted by the XPS file processing unit 140.

If a printing paper option is not set for an XPS file, the control unit 150 controls the UI unit 140 to notify the user that the printing paper option is not set for the XPS file. If the user selects at least one of diverse kinds of available paper, the control unit 150 controls the UI unit 140 to provide a user with a preview on printing data to be printed on the selected paper. If the user selects one of diverse kinds of paper, the UI unit 140 may provide a preview on how the printing data will be printed on the selected paper, on one portion of the UI window.

The control unit 150 adds the searched printing paper as the printing paper option for the XPS file, and stores the XPS file in which the printing paper option is added. Since an XPS file may be repeatedly printed, the control unit 150 sets the printing paper searched by the search unit 132 as a printing paper option for the XPS file, and stores the XPS file, in which the printing paper option is set, in the storage unit 150. In this case, the control unit 150 may rename the modified XPS file, or overwrite the existing XPS file. Such operations may be performed according to a user command, or automatically performed without a user command.

As described above, although a printing paper option is not set for an XPS file, the image forming apparatus 100 can select and print printing paper suitable for the user's demand based on information regarding the width and height in FixedPage data in the XPS file.

Figure 4:
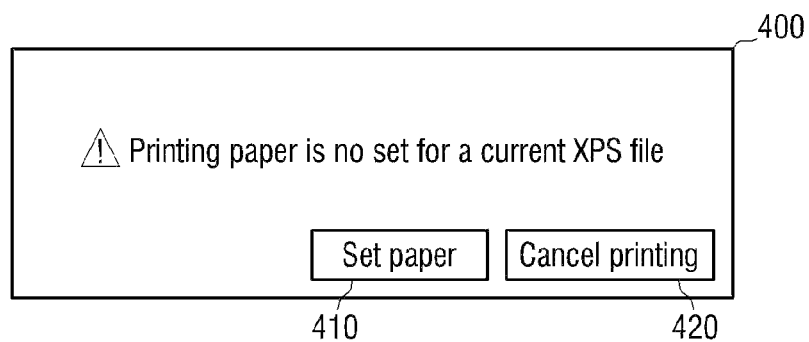
FIGS. 4 and 5 illustrate diverse examples of a user interface window of the image forming apparatus.

FIG. 4 illustrates a UI window 400 to be displayed on an image forming apparatus according to an embodiment of the present invention. The UI window 400 includes an area to display a message reporting that printing paper is not set for an XPS file. If a printing paper option is not set for an XPS file, the image forming apparatus may automatically perform the aforementioned operations, or display a UI window as illustrated in FIG. 4 so that the user can directly select printing paper to print the XPS file.

In the UI window 400, the user can select "Set paper" 410 or "Cancel printing" 420. "Set paper" 410 is a control command to display a UI window in order for the user to directly select printing paper for the XPS file, and "Cancel printing" 420 is a control command to cancel printing the XPS file.

Figure 5:
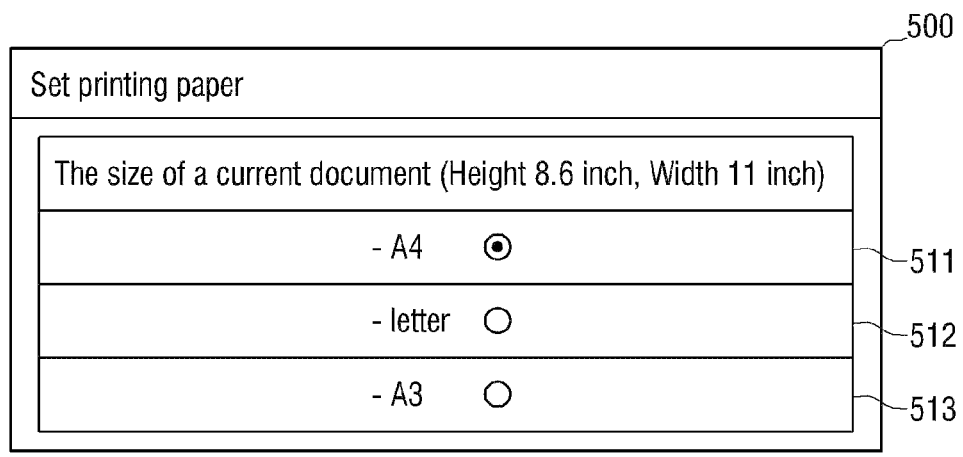

FIG. 5 illustrates an example of a UI window 500 to be displayed when the user selects "Set paper" in FIG. 4. The UI window 500 includes a first area to display information regarding the height and width of a FixedPage, and a second area 511, 512, and 513 to display printing paper searched by the search unit 132 or printing paper which can be selected by the user. The printing paper that can be selected by the user may include paper supported by the image forming apparatus, and paper searched by the search unit 132.

As described above, the user can easily identify that a printing paper option is not set for an XPS file, and can directly select printing paper to print the XPS file through a UI window, so user convenience can be enhanced.

FIGS. 2 to 7 have been described based on a case that an XPS file is received through the communication interface unit 110 and printed. Aspects of the present invention are applicable even when an XPS file is pre-stored in the storage unit 120, by determining whether a printing paper option is set, and searching for printing paper to print the XPS file using information regarding the height and width of a FixedPage as described above.

In addition, aspects of the present invention are applicable to an image forming apparatus, such as a laser printer, copier, facsimile machine, and/or a multifunction peripheral. A terminal device, such as a desktop computer, a laptop computer, and a portable media player (PMP), can perform the operations as described with reference to FIGS. 2 to 7, prior to transmitting an XPS file to an image forming apparatus.

Figure 8:
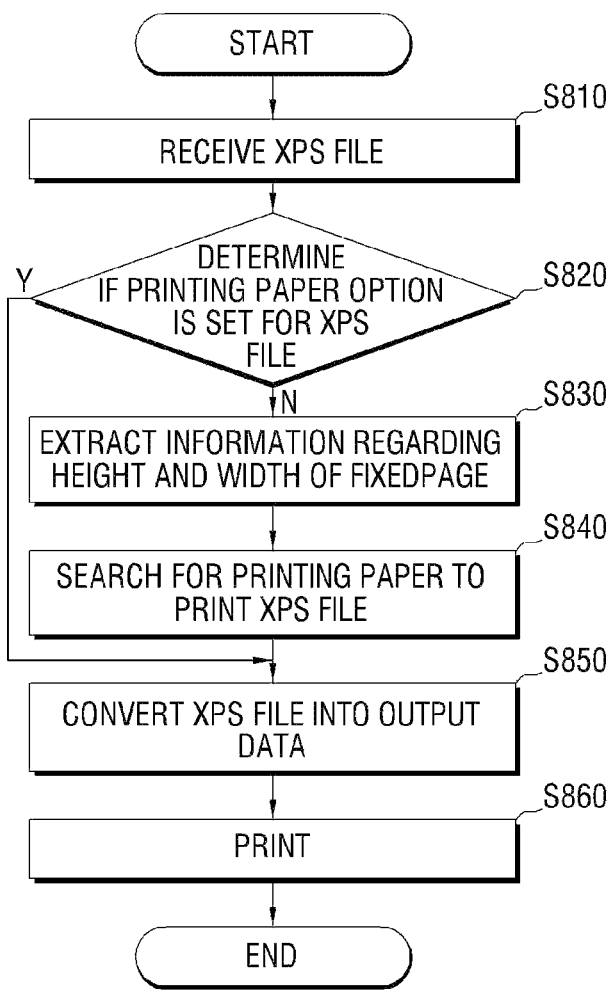
FIG. 8 is a flowchart of a method for forming an image according to an embodiment of the present invention.

FIG. 8 is a flowchart of a method for forming an image using an image forming apparatus according to an embodiment of the present invention. If an XPS file is received in operation S810, then whether printing paper option is set for the XPS file is determined in operation S820. This determination can be performed by analyzing a structure of a PrintTicket of the XPS file, and determining if the PrintTicket of the XPS file includes the tag "PageMediaSize." The XPS file may be received from a terminal device or external storage media in a direct printing method.

In operation S830, if a printing paper option is not set for the XPS file, information regarding the height and width of a FixedPage in the XPS file is extracted. If the printing paper option is not set for the XPS file, the height and width of a certain page can be determined by reading out information regarding the height and width of a corresponding FixedPage in the XPS file. The operation of extracting information regarding the height and width of the FixedPage has been described above with reference to FIG. 3.

In operation S840, printing paper to print the XPS file is searched for based on the extracted information regarding the height and width of the FixedPage. The printing paper can be searched using several different metrics. Printing paper having the height and width greater than the FixedPage may be searched for from among printing paper supported by the image forming apparatus based on the information regarding the height and width of the FixedPage. Printing paper having a low error rate compared with the height and width of the FixedPage may be searched for from among printing paper supported by the image forming apparatus. Printing paper having the lowest error rate compared with the height and width of the FixedPage within a designated error rate range may be searched for. Printing paper may be searched for by preferentially comparing the height and width of the FixedPage with printing paper laid on a tray of the image forming apparatus from among paper supported by the image forming apparatus. A list of printing paper supported by the image forming apparatus may be displayed to the user, and printing paper selected by the user may be searched for as printing paper for the XPS file, as described with reference to FIGS. 4 and 5. The operation of selecting printing paper to print the XPS file has been described above with regard to the search unit 132 of FIG. 2, so a detailed description is not repeated here.

In operation S850, the XPS file is converted into an output data format corresponding to the searched printing paper. The XPS file is converted into output data corresponding to the searched printing paper. If the size of the searched printing paper is smaller than the height and width of the FixedPage, the XPS file may be reduced to fit to the searched printing paper, or an area of the XPS file may be clipped. When the size of the searched printing paper is smaller than the height and width of the FixedPage, the operation of the image forming apparatus has been described above with reference to FIGS. 6 and 7.

In operation S860, the XPS file converted into the output data is printed. The engine unit (not shown) is controlled to perform diverse printing operations so as to print the XPS file converted into the output data. In this case, the searched printing paper is set as the printing paper option for the XPS file, and the XPS file in which the printing paper option is set is stored. Such operation may be performed according to a user command to store the XPS file, or automatically performed.

As described above, in a method for forming an image according to an example embodiment of the present invention, if a printing paper option is not set for an XPS file, information regarding available printing paper is provided to the user using information regarding the height and width of a FixedPage. Therefore, the user can easily obtain printed data as desired. A method for forming an image as in FIG. 8 can be performed by an image forming apparatus having a configuration as in FIG. 2, and other image forming apparatus having different configurations.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. An image forming apparatus, comprising:
   a printing unit;
   a communication interface unit to receive an XML paper specification (XPS) file;
   an XPS file processing unit to convert the XPS file into an output data; and
   wherein the XPS file processing unit comprises:
      a determination unit to determine if a printing paper information is set for the XPS file;
      a search unit to search for the printing paper to print the XPS file based on the information regarding the height and width of the FixedPage in the XPS file when the printing paper information is not set for the XPS file; and
      a data generation unit to convert the XPS file into the output data corresponding to the searched printing paper;
   a control unit to control the printing unit to print the output data,
   wherein the XPS file processing unit determines if printing paper information is set for in the XPS file, and converts the XPS file into the output data corresponding to the printing paper information when the printing paper information is set in the XPS file.

2. The image forming apparatus according to claim 1, wherein the determination unit identifies the presence of a tag "PageMediaSize" in a PrintTicket of the XPS file so as to determine if the printing paper information is set for the XPS file.

3. The image forming apparatus according to claim 1, further comprising:
   a user interface (UI) unit to display a message that a printing paper information is not set for the XPS file if a printing paper information is not set for the XPS file.

4. The image forming apparatus according to claim 1, wherein the search unit searches for printing paper having the lowest error rate compared with the height and width of the FixedPage, or printing paper having the lowest error rate within a designated error rate range compared with the height and width of the FixedPage among printing paper supported by the image forming apparatus.

5. The image forming apparatus according to claim 4, wherein the search unit searches for printing paper having the lowest error rate compared with the height and width of the FixedPage, or printing paper having the lowest error rate within a designated error rate range compared with the height and width of the FixedPage by comparing the height and width of the FixedPage with the size of printing paper laid on a tray of the image forming apparatus.

6. The image forming apparatus according to claim 1, wherein:
the data generation unit converts the XPS file into the output data so as to fit to the searched printing paper when the size of the searched printing paper is smaller than the height and width of the FixedPage,
the data generation unit converts the XPS file into the output data by Clipping an area of the XPS file when the height or width of the FixedPage is greater than the size of the searched printing paper, and
the data generation unit converts all pages of the XPS file into the output data corresponding to the searched printing paper.

7. The image forming apparatus according to claim 3, wherein the UI unit displays the printing paper supported by the image forming apparatus, and receives setting of the printing paper to print the XPS file.

8. The image forming apparatus according to claim 1, further comprising:
a storage unit to set the searched printing paper as an additional printing paper information for the XPS file, and to store the XPS file in which the printing paper information is set.

9. An image forming method of an image forming apparatus, the method comprising:
receiving an XML paper specification (XPS) file;
determining if a printing paper information is set for the XPS file;
when the printing paper information is not set for the XPS file, searching for printing paper to print the XPS file based on the information regarding the height and width of a FixedPage in the XPS file; and
printing the XPS file to correspond to the searched printing paper.

10. The method according to claim 9, wherein the determining operation comprises identifying the presence of a tag "PageMediaSize" in a PrintTicket of the XPS file, and determining if the printing paper information is set based on the presence of the tag "PageMediaSize".

11. The method according to claim 9, further comprising:
displaying a message that the printing paper information is not set for the XPS file when the printing paper information is not set for the XPS file.

12. The method according to claim 9, wherein the searching operation comprises searching for printing paper having the lowest error rate compared with the height and width of the FixedPage, or printing paper having the lowest error rate within a designated error rate range compared with the height and width of the FixedPage among printing paper supported by the image forming apparatus.

13. The method according to claim 12, wherein the searching operation comprises:
comparing the height and width of the FixedPage with the size of printing paper laid on a tray of the image forming apparatus; and
searching for printing paper having the lowest error rate compared with the height and width of the FixedPage, or printing paper having the lowest error rate within a designated error rate range compared with the height and width of the FixedPage.

14. The method according to claim 9, wherein the printing operation comprises:
converting the XPS file into the output data so as to fit to the searched printing paper if the size of the searched printing paper is smaller than the height and width of the FixedPage, converting the XPS file into the output data by clipping an area of the XPS file if the height or width of the FixedPage is greater than the size of the searched printing paper; and
converting all pages of the XPS file into the output data corresponding to the searched printing paper.

15. The method according to claim 9, further comprising:
displaying the printing paper supported by the image forming apparatus; and
receiving a setting of the printing paper to print the XPS file.

16. The method according to claim 15, wherein the receiving operation comprises providing a preview on how the XPS file will be printed on a selected kind of paper after a user selects at least one kind of printing paper from which the user can select.

17. The method according to claim 9, further comprising:
setting the searched printing paper as an additional printing paper information for the XPS file, and storing the XPS file in which the printing paper information is set.

18. An apparatus comprising:
a processing unit to convert an XML paper specification (XPS) file into output data corresponding to printing paper based on information regarding a height and width of a FixedPage in the XPS file; and
a communication unit to transmit the output data to an image forming apparatus for printing,
wherein the processing unit further comprises:
a determination unit to determine whether a printing paper information is set in the XPS file;
a search unit to select the printing paper based on height and width information included in the FixedPage when no printing paper information is set in the XPS file; and
a data conversion unit to convert the XPS file into the output data based on the printing paper.

19. The apparatus according to claim 18, wherein the data conversion unit crops the XPS file when the height and width information included in the FixedPage is greater than a height and width of the printing paper.

* * * * *

UNITED STATES PATENT AND TRADEMARK OFFICE
CERTIFICATE OF CORRECTION

PATENT NO. : 8,441,678 B2  
APPLICATION NO. : 12/542839  
DATED : May 14, 2013  
INVENTOR(S) : Na-young Kim et al.

Page 1 of 1

It is certified that error appears in the above-identified patent and that said Letters Patent is hereby corrected as shown below:

In the Claims

In Col. 11, Line 14, In Claim 6, delete "Clipping" and insert --clipping--, therefor.

Signed and Sealed this  
Eighth Day of October, 2013

Teresa Stanek Rea  
*Deputy Director of the United States Patent and Trademark Office*